Feb. 26, 1952 — W. M. EWING — 2,587,301
METHOD OF SOUND TRANSMISSION
Filed Nov. 16, 1945 — 7 Sheets-Sheet 3

Inventors:
William M. Ewing
Thomas T. Hamilton
by Attorneys

TABLE I

| A<br>NUMBER OF CYCLES<br>N | B<br>HORIZONTAL DISTANCE TRAVELLED PER CYCLE<br>X YDS<br>$\frac{2,137,500}{N}$ | C<br>INITIAL INCLINATION<br>$\theta_0$ | D<br>MEAN HORIZONTAL VELOCITY FT./SEC.<br>V | E<br>TRAVEL TIME SEC.<br>$\frac{6,412,500}{V}$ |
|---|---|---|---|---|
| 25 | 85,500 | 12.19 | 4936.0 | 1299.13 |
| 30 | 71,250 | 11.32 | 4926.0 | 1301.77 |
| 35 | 61,071 | 10.95 | 4917.4 | 1304.04 |
| 40 | 53,438 | 10.80 | 4908.0 | 1306.54 |
| 45 | 47,500 | 9.23 | 4900.8 | 1308.46 |
| 50 | 42,750 | 7.44 | 4896.1 | 1309.71 |
| 55 | 38,864 | 6.54 | 4893.1 | 1310.52 |
| 60 | 35,625 | 5.69 | 4891.0 | 1311.08 |
| 65 | 32,885 | 3.66 | 4890.0 | 1311.35 |
| 70 | 30,536 | 2.67 | 4889.74 | 1311.42 |
| 75 | 28,500 | 2.49 | 4889.64 | 1311.45 |
| 80 | 26,719 | 2.34 | 4889.54 | 1311.47 |
| 85 | 25,147 | 2.20 | 4889.45 | 1311.50 |
| 90 | 23,750 | 2.08 | 4889.37 | 1311.52 |
| 100 | 21,375 | 1.87 | 4889.24 | 1311.55 |
| 110 | 19,432 | 1.70 | 4889.13 | 1311.58 |
| 120 | 17,812 | 1.56 | 4889.03 | 1311.61 |
| 130 | 16,442 | 1.44 | 4888.95 | 1311.63 |
| 140 | 15,268 | 1.35 | 4888.89 | 1311.65 |
| 150 | 14,250 | 1.27 | 4888.84 | 1311.66 |
| ∞ | ∞ | 0.00 | 4888.00 | 1314.03 |

Patented Feb. 26, 1952

2,587,301

UNITED STATES PATENT OFFICE 2,587,301

METHOD OF SOUND TRANSMISSION

William M. Ewing, Woods Hole, Mass., assignor, by mesne assignments, to the United States of America as represented by the Secretary of the Navy Application November 16, 1945, Serial No. 629,048

6 Claims. (Cl. 177—386)

This invention relates to methods of sound transmission and especially to long-range transmission of sound through a medium such as sea water. More particularly, the invention is concerned with a method of transmitting sound signals in which special phenomena encountered in ocean depths are made use of to extend the distances over which audible sound signals may be transmitted.

In one specific aspect the invention deals with a method of communication of specialized character adapted for use by submarines and other vessels, in connection with secret military operations, to enable the personnel of such vessels to send back information from a vantage point at which radio transmitters are unsatisfactory.

The propagation of sound in sea water is known to occur along rays which are subject to refraction by variations in sound velocity. In most areas of the oceans, the velocity of sound varies with depth and temperature, and is less at some intermediate depth than it is either at the surface or at the ocean bottom. These oceanographic conditions produce a "sound channel" having at its horizontal axis a level along which the velocity of sound reaches its minimum value. Essentially, the sound channel provides for a long-range transmission of sound between a sound source and a receiver where both types of sonic equipment are located at a level approximately corresponding to the axis of minimum velocity.

Considering the bathic aspects of the sound channel in greater detail, it is found that in going from a point just below the surface of sea water to increasingly greater depths, there occurs a decrease in temperature and a corresponding decrease in sound velocity. This effect continues through depths ranging from 675 to 700 fathoms. In this region, a minimum sound velocity level is reached beyond which little further temperature change is observed. Below the minimum velocity level, increasing pressure, with increasing depth, causes the velocity of sound to increase gradually at a relatively slower rate compared to its rate of decrease, and ultimately at very great depths of 2000 to 3000 fathoms to regain and exceed the initial velocity present just below the ocean surface.

Therefore, from a refraction point of view, variation of velocity with temperature may be regarded as forming an upper side or "roof" for the sound channel; variation of sound velocity with pressure may be regarded as forming a lower side or "floor" for the sound channel. It should also be observed that the so-called roof or upper side of the sound channel is located away from the axis of the channel a distance much less than the distance between the axis of the lower side or floor of the channel.

I have discovered that a bathic sound channel may be utilized as a refracting medium to achieve two important objectives. One is the separation of a source of sound energy into a series of successively occurring sound impulses which are characterized by progressively greater intensity, leading up to an abrupt and highly identifiable endpoint. A second objective is to prevent loss of sound energy due to reflection of sound rays at the surface or bottom of the ocean, and thus to provide for long-range sound transmission.

Figure 1:
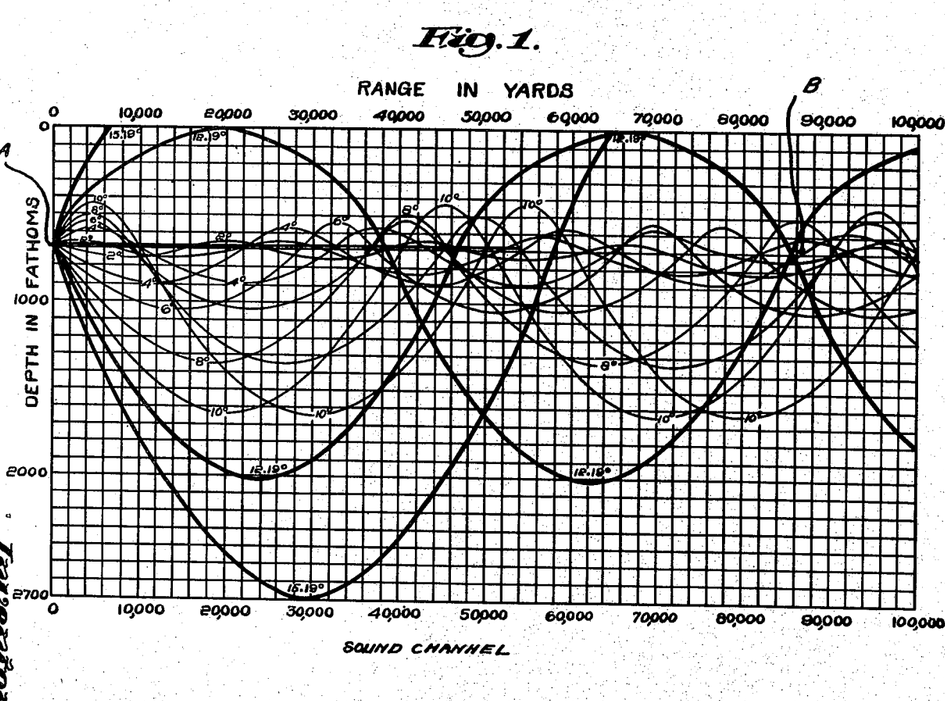
Fig. 1 illustrates a chart diagrammatically indicating propagation of sound along sound rays in sea water.

Since the minimum sound velocity axis occurs at a relatively great depth (approximately 700 fathoms), there is provided above and below this level a distance through which a limited number of sound rays may be completely refracted by the sound channel and may be turned back without ever reaching the surface or bottom of the ocean, thereby to furnish continuous paths along which it is believed that sound impulses may traverse great distances. Only a limited number of rays whose angles of inclination to a horizontal axis are such as to permit complete refraction by the "roof" of the sound channel are available for this purpose. In Fig. 1 of the drawings a typical sound channel together with a series of refracted sound rays has been diagrammatically indicated, and extending across the diagram in a horizontal manner is a heavy line intended to further indicate the approximate axis of the sound channel.

It is suggested that sound energy instead of being absorbed in passing through a body such as sea water, as is commonly believed, is largely dissipated as a result of reflection at the surface and bottom of the ocean. When reflection of the sound rays is prevented as a result of the rays being refracted to form continuous reversely bent paths which extend in a generally horizontal direction, there occurs little loss of energy. This feature persists to a useful extent even though there occurs considerable deviation. Sound signals occurring along such reversely bent rays may in this way be transmitted over distances of several thousand miles. This explanation of sound energy dissipation is offered as a matter of opinion only and is not to be regarded as limiting the invention to it in any sense.

Essentially, therefore, the invention includes a method of sound transmission in which a sound is generated in a medium of varying refractive power at a minimum sound velocity level. At a distant point in the medium and at the same sound velocity level, a series of successively occurring sound impulses emanating from the generated sound are observed for the purposes of identifying and locating the generated sound and receiving communications. Best results may be obtained by generating and observing sound signals at regions along the minimum sound velocity level extending upwardly for a distance approximately half-way between the minimum velocity level and the roof or surface of the sea, and extending downwardly a distance approximately half-way between the minimum sound velocity level and the floor or ocean bottom. Beyond these regions, results are progressively poorer.

An important feature of the invention is a method of transmitting sound through sea water over relatively great distances and in a manner such that the transmitted sound signal is distinguishable from various other sounds which may occur in the ocean, to provide a novel communication system.

Another important feature of the invention is a method of sound transmission characterized by the fact that a signal may be generated and propagated without interference of the type commonly referred to as radio "jamming."

Another feature of this invention is that by noting particularly the time interval between reception of signals received at two widely separated stations, a geographical line of position may be deduced which is known to pass through the location of the sound source.

Another feature of this invention is that by noting particularly the time of reception of signals at more than two widely separated stations, geographical lines of position may be established from each pair of stations, the intersection of these lines denotes the exact location of the sound source.

Another feature of this invention is the combination with a radio signal emitted at the sound source in synchronism or in known time relation with the acoustical signal. By noting particularly the time interval between reception of these two signals at any receiving station, the distance of the sound source from this station may be computed.

Another feature is a method of sound transmission in which the duration of the signal received and its intensity provide a measure of the distance which the signal has traveled.

Various other features will appear from the following description.

In the accompanying drawings:

Fig. 9 is still another chart of the character referred to; and

The drawings and description pertaining thereto deal with a preferred embodiment of the invention relating to sound transmission in sea water. However, it is intended that the invention may be practiced in other forms as for example one in which sound is transmitted through other media characterized by varying refractive power such as for example the atmosphere and other bodies.

In carrying into effect a preferred embodiment of the method of the invention, I first determine the minimum sound velocity level or axis for an ocean area over which sound is desired to be transmitted. Such a determination may be obtained by reference to known oceanographic information. Inspection of the published oceanographic data relating to temperature, salinity and pressure, shows for example that over much of the total area of the oceans, there is a permanent sound channel at a depth of from 675 to 700 fathoms, as illustrated in Fig. 1.

Figure 2:
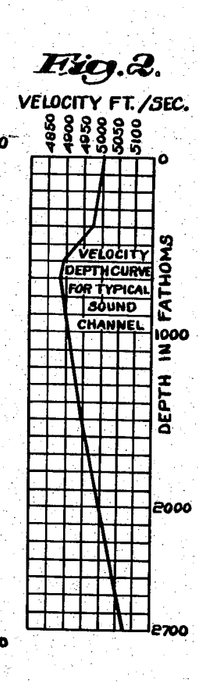
Fig. 2 is a velocity depth chart diagrammatically indicating temperature and pressure conditions in sea water.

Attention is directed to Fig. 2 in which is illustrated a downwardly extending curve prepared from published data and representing a change in sound velocity occurring with a change in depth for a large part of the North Atlantic Ocean. It will be observed that the upper portion of the curve extends downwardly and from right to left as viewed in Fig. 2, indicating a decrease in sound velocity which is caused by a temperature drop throughout that particular region.

At a depth of approximately 675 fathoms, the curve starts to change its direction and to move downwardly and from left to right as viewed in Fig. 2. At the point of change, therefore, the velocity of sound is at a minimum and at greater depths gradually increases in value. This is caused by absence of further change in temperature and increasing pressure with depth.

The minimum sound velocity value measured at the point of change of direction of the curve is about 4880 feet per second. The greatest velocity occurring above and below this depth is about 5010 feet per second which occurs at the surface and at a level of 2030 fathoms respectively. The sound channel in this case may be described as extending from the surface of the ocean to a depth of 2030 fathoms, with its horizontal axis at a level of 675 fathoms and having a velocity differential of about 130 feet per second.

The velocity depth curve of Fig. 2, although actually representing the relation between velocity of sound propagation and depth beneath the surface at one place, may as already noted be considered as typical for a large area—in fact for the greater part of the whole North Atlantic—due to the fact that only slight changes in sound velocity occur over very large horizontal distances.

At some desired point A (Fig. 1) in an ocean area having sound velocity characteristics, of which the curve of Fig. 2 is representative, sound generating means are put into the ocean. The sound generating unit is suspended at a depth corresponding to, or in the general region of the minimum sound velocity level.

I have found that one convenient method of generating sound at substantial depths is to employ explosives, such as a depth charge including an electric blasting cap and a bomb consisting of TNT contained in rubber bags, which may be detonated in depths up to 3000 fathoms. The bomb may be controlled by a firing mechanism which is released from a surface ship or underwater vessel. The firing mechanism, together with the bomb, is caused to sink rapidly to a depth corresponding to a minimum sound velocity level, and then to slow down and fire the bomb. A plurality of bombs detonated successively may also serve to provide a means of communication.

Figures 3, 4:
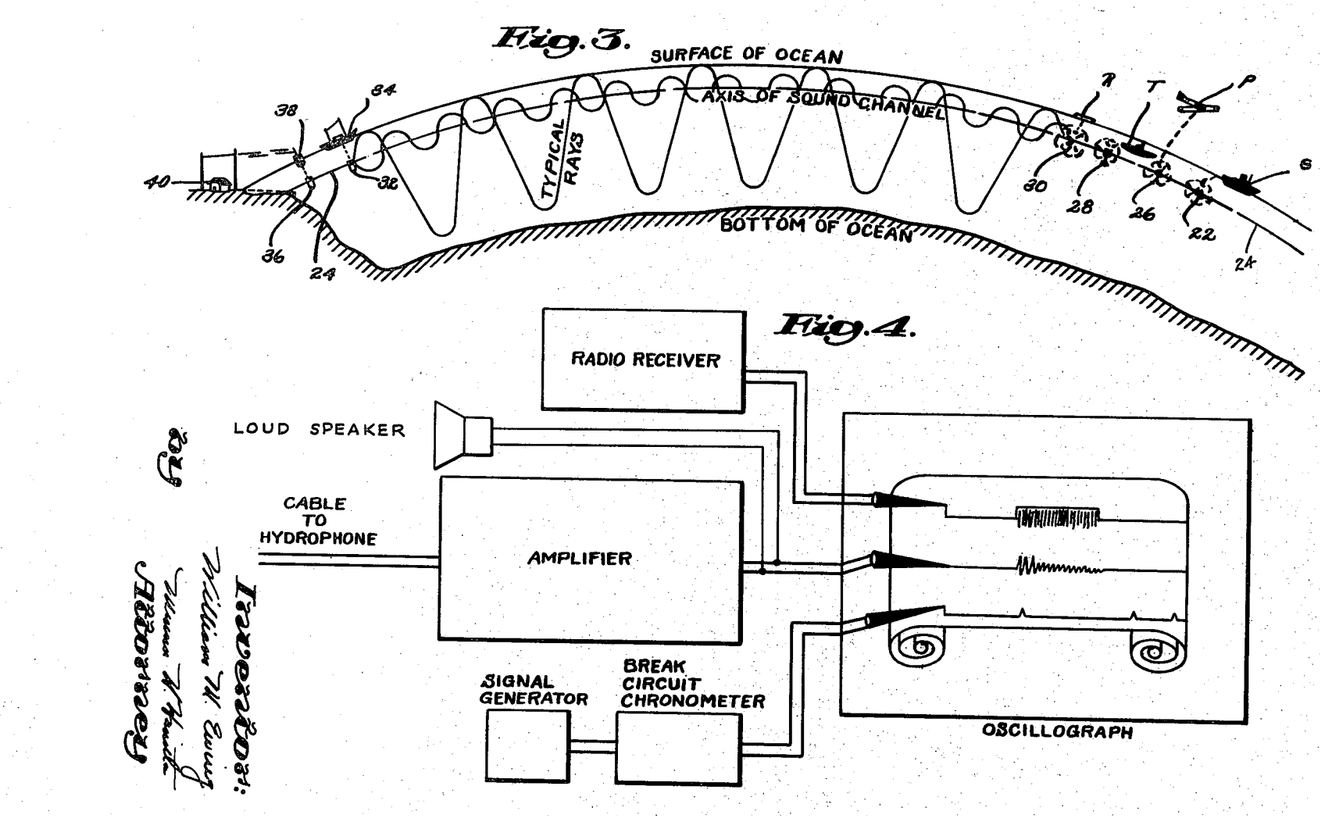
Fig. 3 is a diagrammatic view illustrating the method of the invention.
Fig. 4 is a block diagram illustrating equipment employed in carrying out the invention.

Sound receiving equipment is also put into the ocean at some distant point as B (Fig. 1), at a depth generally corresponding to the sound axis level at which point A occurs. The sound receiving equipment includes means for detecting sound impulses and means for converting the sound impulses into electrical impulses. One preferred arrangement has been indicated in Figs. 4, 5 and 6. Fig. 4 is a block diagram, more or less self-explanatory, illustrating amplifying means, radio receiver means, and oscillograph means which are employed in a manner familiar to those skilled in the art, to provide audible and visual indications of signals picked up by a hydrophone at the sound axis.

Figure 5:
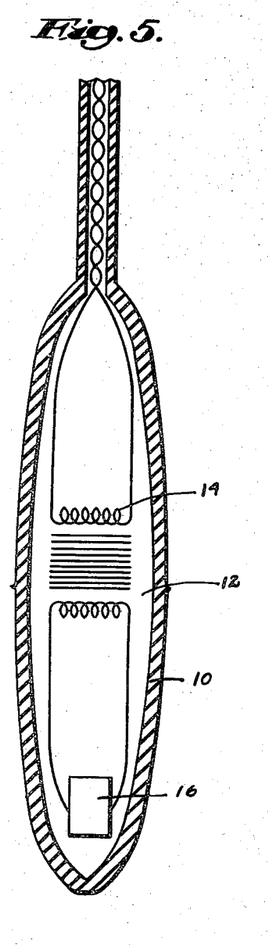
Fig. 5 is a view in cross section indicating a hydrophone.
Figure 6:
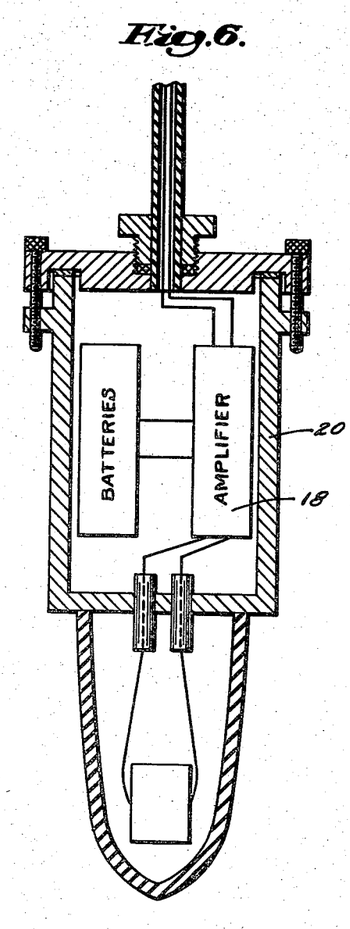
Fig. 6 illustrates another type of hydrophone.

Considering in detail the hydrophone illustrated in Figs. 5, 10 indictaes a rubber casing in which is supported a body of oil 12. Immersed in the body of oil is a transformer 14 having connected at its lower end a piezoelectric crystal 16. The crystal is so made that minute acoustic pressures are mechanically transformed to produce opposite charges on different faces of the crystal. A modified arrangement in which the hydrophone is attached directly to amplifying means 18 in a casing 20 has been indicated in Fig. 6. Various other conventional arrangements may be utilized.

In Fig. 3 I have indicated diagrammatically a number of suitable ways of utilizing sound generating and sound receiving equipment of which the above described apparatus is intended to be illustrative. With reference to the sound generating means, I have shown a ship S at the surface of the ocean, from which a bomb 22 may be dropped and in the manner already noted caused to explode at or near the minimum sound velocity axis 24. This operation may be carried out in other ways, as for example by dropping a bomb 26 from an airplane P; or by discharging a bomb 28 from a submerged submarine T; or by dropping a bomb 30 from a life raft R. Similarly in receiving the signals from detonated bombs a hydrophone 32 located at or near the axis of the sound channel may be suspended from a vessel 34; or a hydrophone 36 may be suspended from an automatic radio buoy 38 for transmitting signals to shore or ship station; or a hydrophone may be connected directly to a short station 40.

Fig. 1 illustrates refraction of sound rays as transmitted in a typical bathic sound channel. The sound generating means provides a non-directional sound source at the point A located on the axis of the sound channel. Sound rays diverge in all directions from this source; however, only those rays diverging in significant directions are shown on the diagram. On each ray is denoted the number of degrees in the angle formed by that ray with respect to the horizontal axis. This angle is referred to as the angle of initial inclination for the ray. It is important to note that for the depth noted of 675 fahoms along which the approximate axis of minimum sound velocity occurs, there will be a limited number of rays which will be subject to complete refraction. Such a ray is represented by one having an angle of initial inclination of 12.19°, together with a group of rays having progressively smaller angles of inclination as shown.

Therefore it may be readily seen that any ray with initial inclination of 12.19° above the horizontal and below the horizontal will be refracted back and forth between the upper and lower parts of the sound channel in such a way that it can travel any desired distance without the necessity of undergoing reflections at either the surface or the bottom of the ocean. A ray having an angle value in excess of 12.19° will not be completely refracted and will be subject to reflection with consequent dissipation of energy. Such a ray is illustrated by the ray noted with the angle value of 15.19° in Fig. 1.

Figure 8:
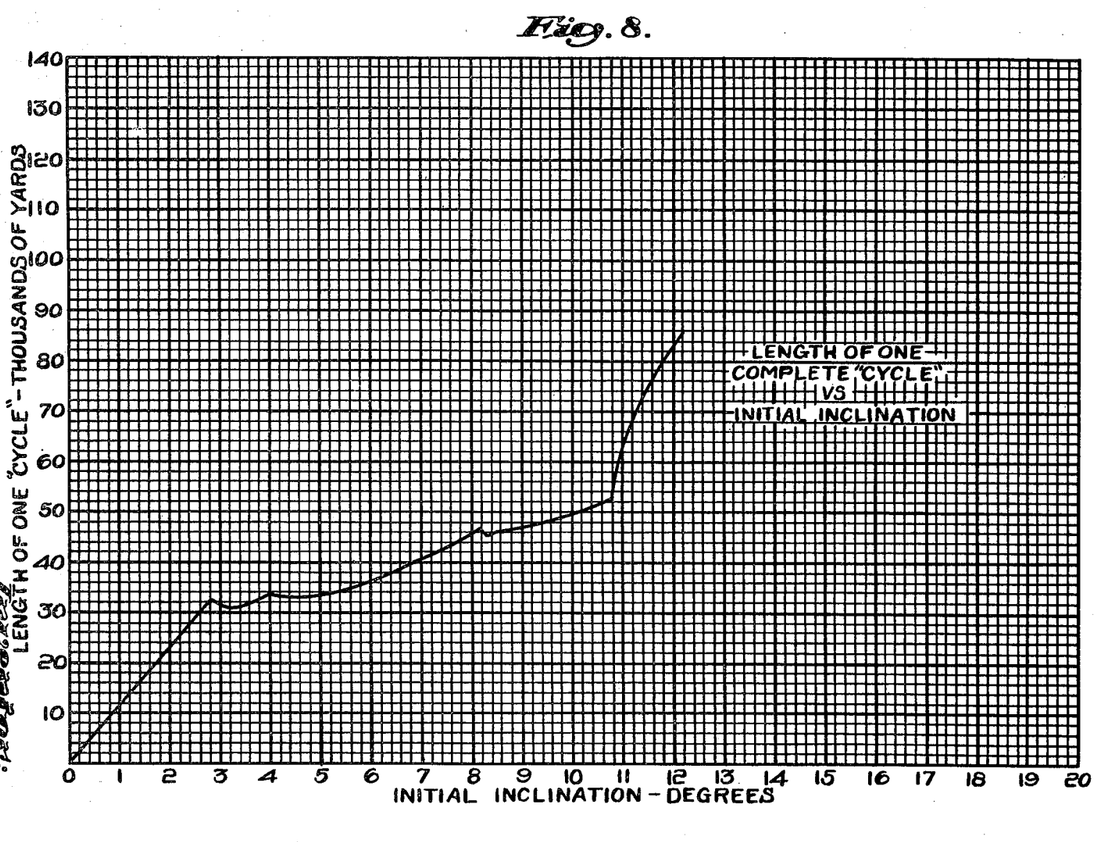
Fig. 8 is another chart carrying data utilized in connection with the invention.

Another important aspect of the invention resides in the fact that the average speed of forward progress is greatest for those rays which, in Fig. 1, have the largest initial inclinations to the horizontal sound axis. Although the actual path length is greater for these rays than for those with small angles, this added distance is more than cancelled by the fact that much of the distance is traversed in regions where the velocity of propagation is much greater than at intermediate regions. These relations are indicated in Figs. 8, 9 and 10.

Figure 9:
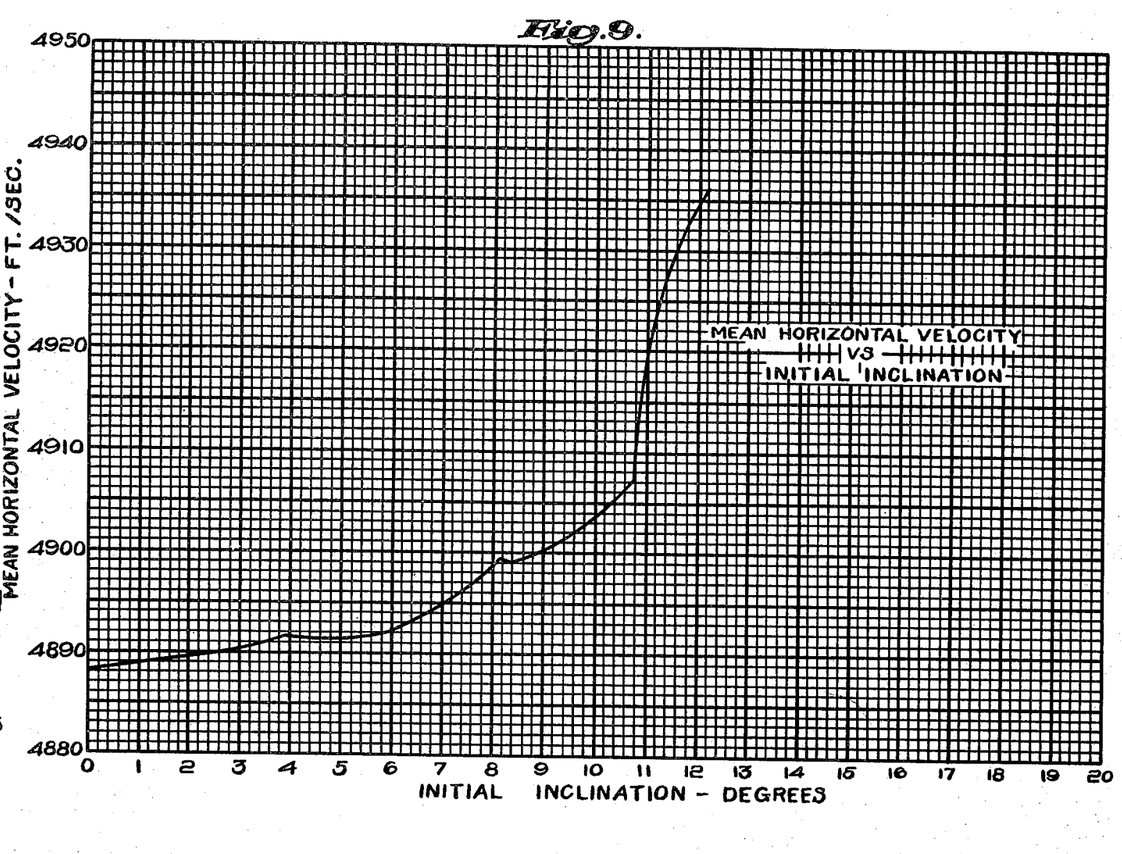
Figure 10:
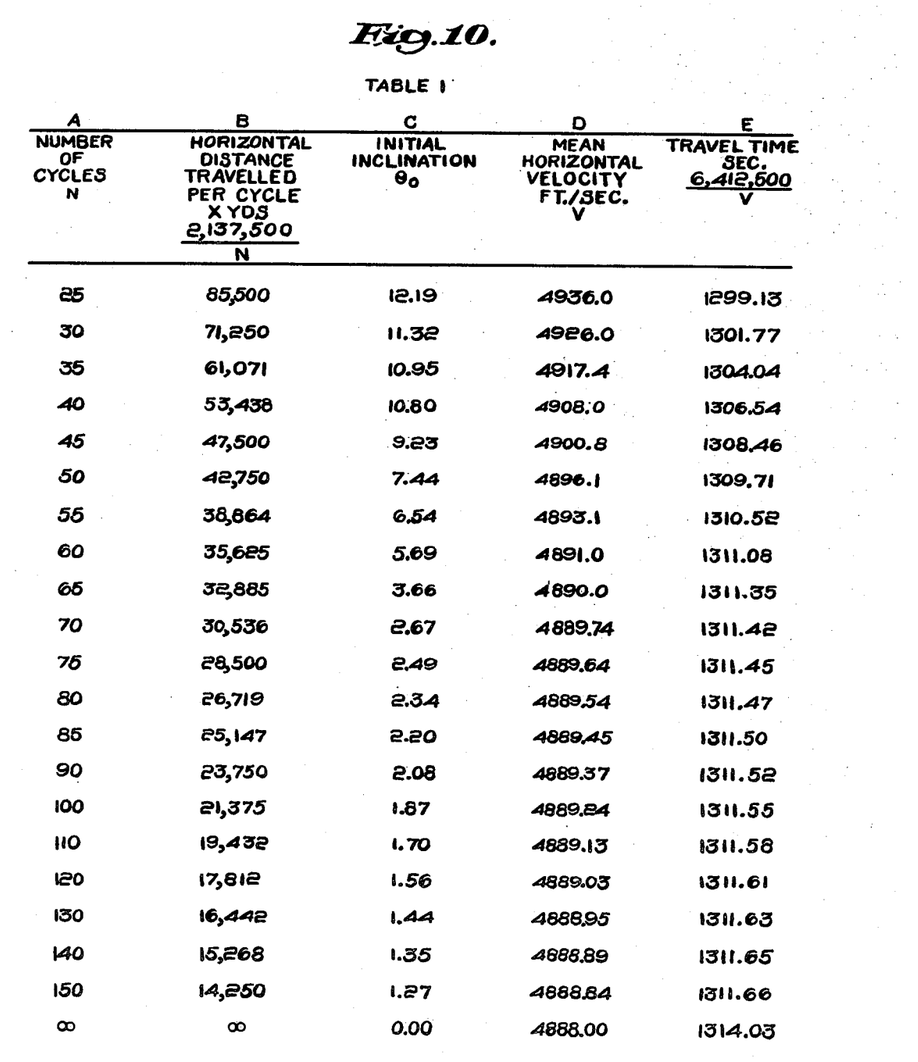
Fig. 10 is a table of data utilized in connection with the charts shown in Figs. 8 and 9.

The relation between mean horizontal velocity and the initial inclination of the ray, for the typical sound channel considered in Fig. 1, is shown in Fig. 9. It may be seen from an inspection of Fig. 1 that the largest initial angle which a ray may have and still remain in the sound channel is 12.19°, and that the horizontal distance traversed in one "cycle" of this ray is about 85,500 yards, or about 42 miles (Fig. 8).

Now, for a hydrophone on the axis of the sound channel at a distance of say 1050 miles, this ray will reach the hydrophone after making 25 cycles (1050 miles divided by 42) in its pattern. Moreover, the sound which travels along this 12.19° ray will be the first sound from the given source to reach the hydrophone, for it has the greatest possible mean horizontal velocity of 4936.0 ft./sec., as shown in Fig. 9. The ray which makes 26 cycles in travelling between these same two points will make $$\frac{25 \times 85,500}{26} = 82,211$$

yards per cycle. Fig. 10 is a table giving in column B the number of yards per cycle for the rays making various numbers of cycles between 25 and 150, for the example in question, namely, where shot and receiver are about 1050 miles apart.

The initial inclination, $\theta°$ in column C, Fig. 10, may be read approximately for each value of the horizontal distance travelled per cycle from the ray diagram of Fig. 1, but more accurately from Fig. 8. The inclinations obtained are shown in Fig. 10 column C. For each value of the initial inclination in Fig. 10, the corresponding value of the mean horizontal velocity V is read from Fig. 9 and entered in column D of Fig. 10. Each of these values of mean horizontal velocity may be used to find the travel time for the corresponding path by simple division into the distance assumed for this example, namely 25×85,500 yards, or about 1050 miles. These travel times are given in column E of Fig. 10.

It may be seen from Fig. 10 that the ray for the first sound to arrive makes 25 cycles, corresponding to an initial inclination of 12.19°, and has a travel time of 1299.13 seconds, while that for the last one has an initial inclination of zero corresponding to an unlimited number of cycles, and has a travel time of 1314.03 seconds. Thus the total duration of received signal at this distance would be about 15 seconds. Furthermore, the time interval between successive arrivals is approximately 0.5 second at the beginning of the signal, which is sufficiently long that one could expect the successive arrivals to be recognized as such by merely listening to them. But it is seen that the interval between successive arrivals becomes less and less, so that toward the end of the signal these arrivals will undoubtedly merge together and become unresolvable either by ear or by the oscillograph recording.

Calculations show that if the sound channel were idealized to have a single velocity gradient above the axis and a single one below it, then the intensity of signal received along a given ray would be approximately the same for all rays. This consideration, taken together with the conclusion that the time interval between successive arrivals becomes shorter and shorter, indicates that the average intensity of sound received— that is, the energy received per unit of time— which is due to the combined action of the sounds received along all possible individual rays, increases throughout the duration of the signal.

Thus for the distance noted, it becomes possible to make the following deductions:

The approximate duration of the signal is 15 seconds at this distance. There occurs a gradual increase in the average intensity of sound from the beginning of the signal to its end. There are audible fluctuations in intensity during the early part of signal, with fluctuations increasing in tempo during the signal to the degree that they become indistinguishable toward the end. The end of the signal consists of an abrupt drop in intensity from maximum value to zero. A signal having the above features is so characteristic that it is readily distinguishable from sounds due to explosions at other depths. The signal consists predominantly of low frequency sound.

Figure 7:
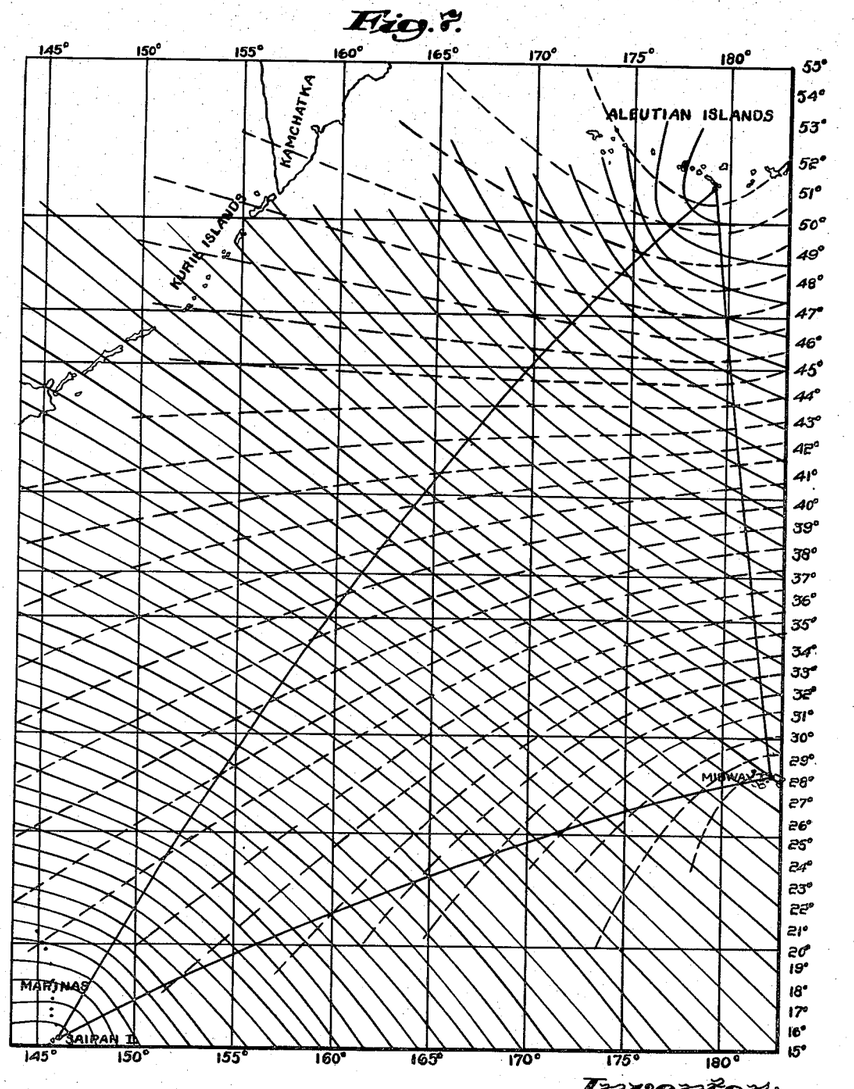
Fig. 7 is a chart illustrative of the use of stations in carrying out the method of the invention.

The method of the invention may be utilized as a means of communication in several ways. One application will be readily seen to be conveying information by means of a code based on observation of time intervals between successive signals in the manner already discussed, and indicated diagrammatically in Figs. 1, 2 and 3. Another application of the invention consists in determining the geographical position of a sound source. Fig. 7 is intended to better indicate this operation. In this figure three stations are illustrated, including for instance a station at Midway island, another station at Saipan island, and a third station at the Aleutian Islands. For each station, a series of distance curves are drawn based on known travel times of sound in sea water. Each of the three stations is equipped with suitable receiving equipment located at proper sound axis levels and connected to the station. The particular time of arrival of a sound signal at each station is noted and from this an indication of the approximate distance is obtained and plotted on the proper distance curve. The data thus obtained by one station are communicated by radio or other means to a second station. The operator there then plots the point of intersection of two geographical lines of position and thus fixes the approximate geographical sound source. Another method is to use the sound signal in synchronism with a radio signal and noting the time interval between the reception of the different signals. Various other arrangements may be employed.

While I have shown a preferred embodiment of my invention, it should be understood that various changes and modifications may be resorted to, in keeping with the spirit of the invention as defined by the appended claims.

I claim:
1. Improved method of sound transmission which comprises generating sound in a fluid medium at its minimum sound velocity level, and observing at another point in the fluid medium along the same sound velocity level the occurrence of successive sound impulses emanating from the generated sound.

2. Improved method of sound transmission which comprises generating sound in the ocean at its minimum sound velocity level, and observing at a distant point along the same sound velocity level the occurrance of an interrupted sequence of sound impulses emanating from the generated sound, said impulses being characterized by a gradually increasing intensity, and an abrupt ending.

3. That improved communication method which comprises detonating an explosive in the ocean at its minimum sound velocity level and observing at another point in the ocean along the same sound velocity level refracted sound impulses emanating from the explosion.

4. That improved method which comprises detonating an explosive in the ocean at its minimum sound velocity level to separate the sound of the explosion in a series of sound rays, recording at another point on the ocean along the same sound velocity level a succession of refracted sound impulses emanating from the explosion, and then measuring the change in time intervals occurring between successive sound impulses to determine the location of said generated sound.

5. Long-range transmission of sound under water which comprises generating a source of sound at a depth at which refracted sound rays emanate from the said source of sound and converge repeatedly along a sound channel, and observing a succession of sound impulses arriving at a point in the channel remotely located with respect to the location of the sound source.

6. Method of communication which comprises generating sound in a fluid medium at its minimum sound velocity level to separate the sound into a series of characteristic sound impulses, and then observing from a point along the sound velocity level the time interval between reception of signals at two widely separated stations to arrive at a geographical line of position which passes through the sound source.

WILLIAM M. EWING.

REFERENCES CITED

The following references are of record in the file of this patent:

UNITED STATES PATENTS

| Number | Name | Date |
|---|---|---|
| 913,528 | Marriott | Feb. 23, 1909 |
| 1,149,976 | Furber | Aug. 10, 1915 |
| 1,240,328 | Fessenden | Sept. 18, 1917 |
| 1,706,066 | Karcher | Mar. 19, 1929 |